United States Patent
Kilstein et al.

(10) Patent No.: US 11,540,029 B2
(45) Date of Patent: Dec. 27, 2022

(54) METHODS AND SYSTEMS FOR REDUCING PIRACY OF MEDIA CONTENT

(71) Applicant: Synamedia Limited, Staines Upon Thames (GB)

(72) Inventors: Golda Weyl Kilstein, Jerusalem (IL); David Livshits, Jerusalem (IL); Vered Anikster, Jerusalem (IL); Michal Irit Devir, Jerusalem (IL); Samie Beheydt, Geluwe (BE)

(73) Assignee: Synamedia Limited, Staines Upon (GB)

( * ) Notice: Subject to any disclaimer, the term of this patent is extended or adjusted under 35 U.S.C. 154(b) by 105 days.

(21) Appl. No.: 16/869,504

(22) Filed: May 7, 2020

(65) Prior Publication Data
US 2021/0352381 A1 Nov. 11, 2021

(51) Int. Cl.
*H04N 21/231* (2011.01)
*H04N 21/2343* (2011.01)
(Continued)

(52) U.S. Cl.
CPC ..... *H04N 21/8456* (2013.01); *H04N 1/32144* (2013.01); *H04N 21/23418* (2013.01); *H04N 21/812* (2013.01); *H04N 21/8358* (2013.01)

(58) Field of Classification Search
None
See application file for complete search history.

(56) References Cited

U.S. PATENT DOCUMENTS

| 2004/0133794 A1* | 7/2004 | Kocher | G06F 21/62 713/193 |
| 2004/0136393 A1* | 7/2004 | Riveiro Insua | H04B 3/54 370/432 |

(Continued)

FOREIGN PATENT DOCUMENTS

| WO | 2009122385 A2 | 10/2009 |
| WO | 2009156973 A1 | 12/2009 |

OTHER PUBLICATIONS

PCT International Search Report and Written Opinion dated Sep. 1, 2021, International Application No. PCT/IB2021/000326, pp. 1-13.

(Continued)

*Primary Examiner* — Brian T Pendleton
*Assistant Examiner* — Jean D Saint Cyr
(74) *Attorney, Agent, or Firm* — Fernando & Partners, LLP

(57) ABSTRACT

Techniques for reducing piracy of media content are described. In some embodiments, a collusion resistant method is performed at a device, where the device receives a first request for a base copy of a media content item. In response, the device determines a first transformation based on a statistical performance criterion and a viewing performance criterion. The device further generates a first copy of the media content item by replicating and applying a first transformation to the base copy, where the first copy of the media content item satisfies the viewing performance criterion, and the first copy of the media content item is statistically different from the base copy or other copies in accordance with the statistical performance criterion. The device then causes transmission of the first copy of the media content item in combination with a first watermark for the base copy of the media content item.

30 Claims, 10 Drawing Sheets

(51) Int. Cl.

| | |
|---|---|
| *H04N 21/235* | (2011.01) |
| *H04N 21/239* | (2011.01) |
| *H04N 21/254* | (2011.01) |
| *H04N 21/266* | (2011.01) |
| *H04N 21/435* | (2011.01) |
| *H04N 21/647* | (2011.01) |
| *H04N 21/845* | (2011.01) |
| *H04N 1/32* | (2006.01) |
| *H04N 21/234* | (2011.01) |
| *H04N 21/81* | (2011.01) |
| *H04N 21/8358* | (2011.01) |

(56) References Cited

U.S. PATENT DOCUMENTS

| | | | |
|---|---|---|---|
| 2005/0175224 A1 | 8/2005 | Venkatesan et al. | |
| 2007/0050293 A1* | 3/2007 | Peterka | G06F 21/10 |
| | | | 705/50 |
| 2008/0282307 A1* | 11/2008 | McDonald | H04N 21/25825 |
| | | | 348/E7.071 |
| 2010/0100971 A1 | 4/2010 | Geyzel et al. | |
| 2011/0060814 A1* | 3/2011 | Fukui | H04L 9/40 |
| | | | 709/219 |
| 2016/0026393 A1* | 1/2016 | Reddy | G06F 16/174 |
| | | | 711/154 |
| 2021/0211483 A1* | 7/2021 | Lu | H04N 21/44004 |
| 2021/0216916 A1* | 7/2021 | Madhavan | G06K 9/6286 |

OTHER PUBLICATIONS

Yu-Tzu Zu Lin et al., "Collusion-Resistent Video Fingerprinting Based on Temporal Oscillation," 2008 15th IEEE International Conference on Image Processing, IEEE, 2008, pp. 1-4.

\* cited by examiner

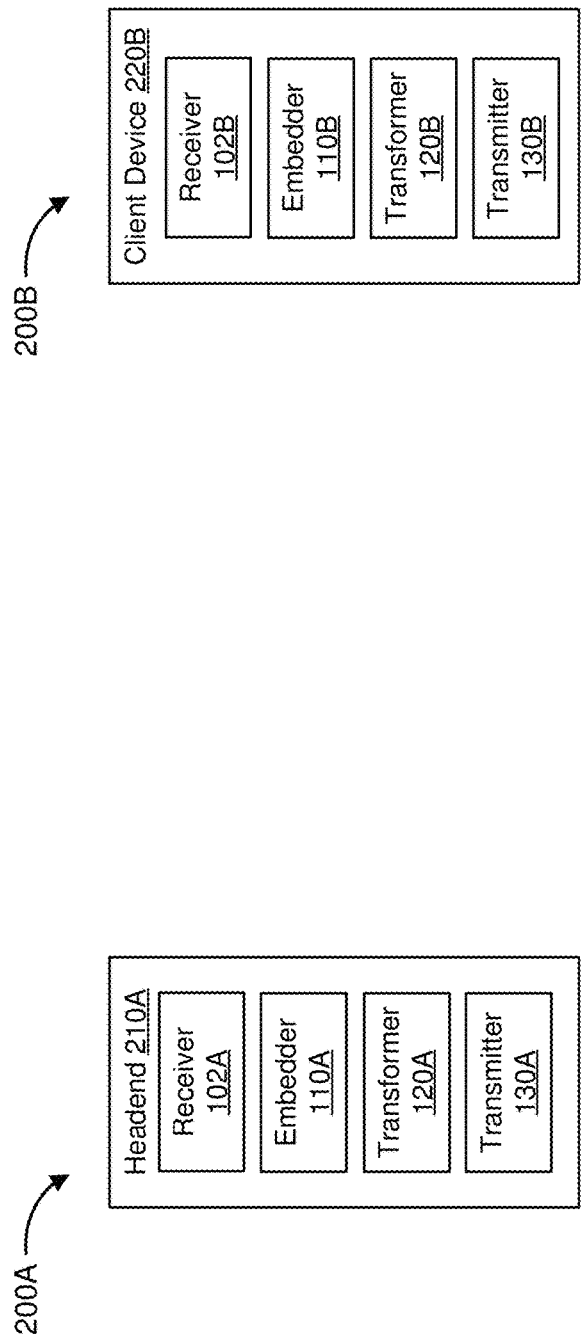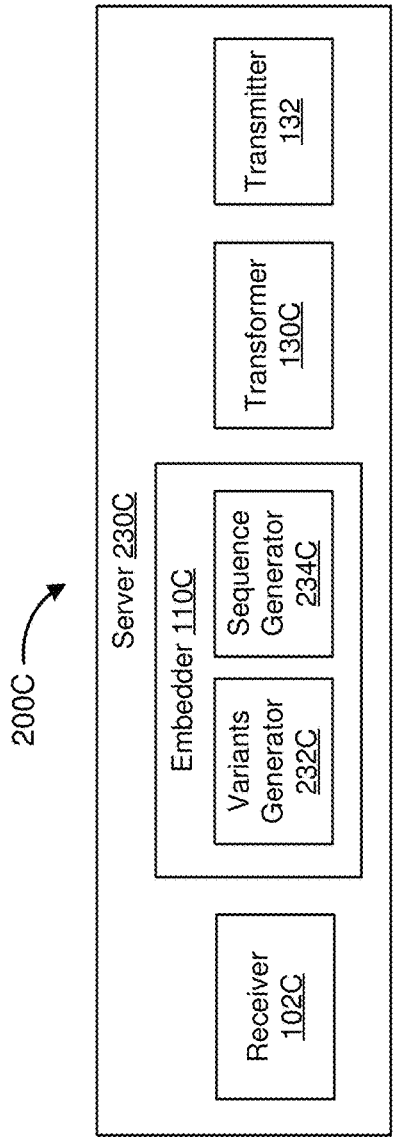

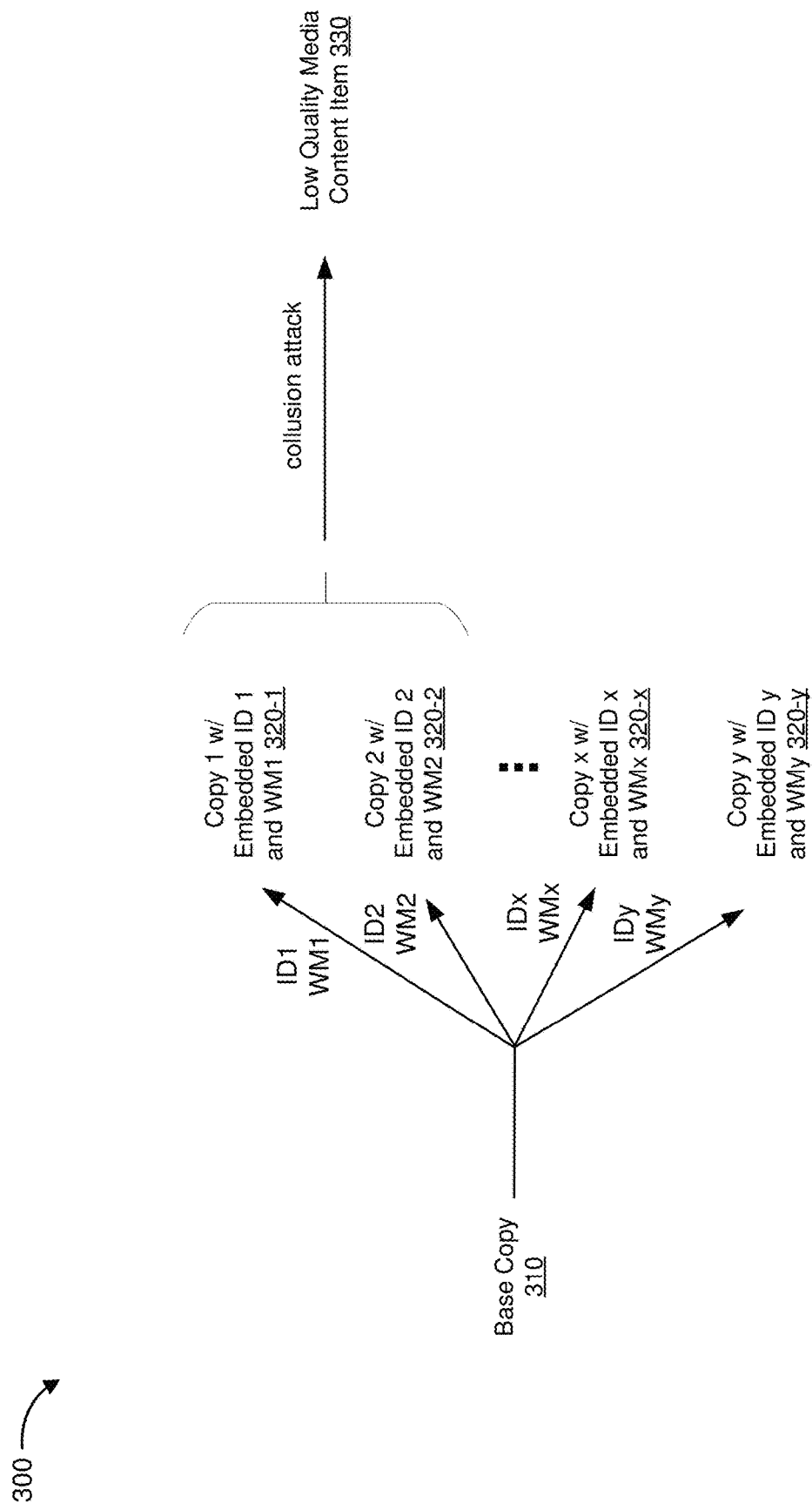

METHODS AND SYSTEMS FOR REDUCING PIRACY OF MEDIA CONTENT

TECHNICAL FIELD

The present disclosure relates generally to reducing piracy of media content.

BACKGROUND

The process of hiding or embedding information in media content generally comes under the category of watermarking. Digital watermarking (sometimes also known as "forensic watermarking") typically refers to the watermarking process where the embedded data identifies a media content item itself, as well as the content owner, operators, redistribution networks, and/or consumer devices associated with the distribution and consumption of the media content item. For example, in case a user leaks certain media content, his/her identity (ID) may be traced using embedded data. The watermark identifier is often encoded in an imperceptible manner while still allowing recovery of the watermark identifier even if the media content is modified.

One type of attack on watermarks is collusion attack. When the media content item is a video, collusion attacks typically work by gathering copies of the same video, each embedded with a unique watermark, colluding these copies, and generating a video that is a combination of the original copies. The combination may yield to the watermark corruption, thus making the watermark detection difficult or even impossible.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 2A-2C are block diagrams of exemplary configurations of collusion resistant systems in accordance with some embodiments;

FIG. 3 is a block diagram illustrating one transformation technique in accordance with some embodiments;

Figure 1:
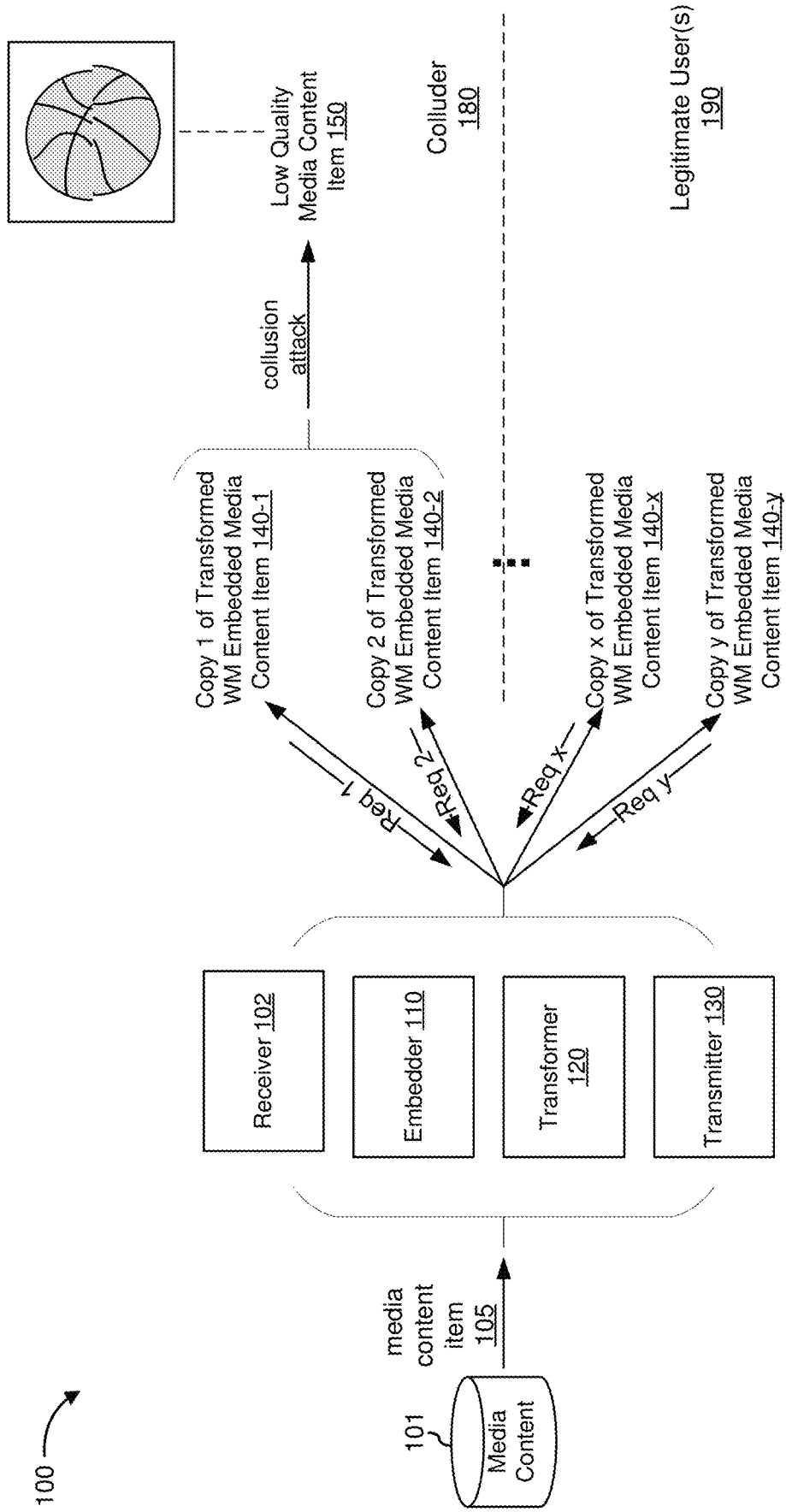
FIG. 1 is a block diagram of an exemplary collusion resistant system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Collusion resistant techniques described herein de-motivate colluders in order to reduce media content piracy. Previously existing anti-collusion mechanisms focus on making more robust watermarks that can survive various collusion attacks. The collusion resistant techniques described herein degrade the quality of the media content item upon collusion and at the same time preserve the embedded watermarks. Moreover, the collusion resistant techniques described herein maintain the quality of the media content item for legitimate users, e.g., viewers not colluding. In some embodiments, a system in accordance with embodiments described herein generates multiple copies of a media content item and applies different transformations to each copy. As a result, when a colluder attempts to combine multiple copies of the video, the output is a video with downgraded quality that makes the pirated video not attractive. Such a solution is independent of the underlying watermark technique, robust against collusion techniques (including new collusion techniques that may be developed in the future), and yet at the same time does not downgrade the video quality for legitimate users and does not degrade the detectability of the original watermark.

In accordance with various embodiments, a method is performed at a device including a processor and a non-transitory memory. The method includes receiving a first request for a base copy of a media content item. The method further includes determining, in response to the first request, a first transformation based on a combination of a statistical performance criterion and a viewing performance criterion that is set relative to a view performance characterization of the base copy of the media content item. The method also includes generating a first copy of the media content item by replicating and applying a first transformation to the base copy of the media content item, where the first copy of the media content item satisfies the viewing performance criterion, and the first copy of the media content item is statistically different from the base copy of the media content item in accordance with the statistical performance criterion. The method additionally includes causing transmission of the first copy of the media content item in combination with a first watermark for the base copy of the media content item.

In accordance with various embodiments, a method is performed at a device including a processor and a non-transitory memory. The method includes receiving a first request for a base copy of a media content item. The method also includes determining a first transformation based on a combination of a statistical performance criterion and a viewing performance criterion that is set relative to a view performance characterization of the base copy of the media content item. The method additionally includes generating a first copy of a media content item by replicating and applying the first transformation to a base copy of the media content item, where the first copy of the media content item satisfies the viewing performance criterion and the first copy of the media content item is statistically different from the base copy of the media content item and previously generated copies of the media content item generated by the device in accordance with the statistical performance criterion. The method further includes transmitting the first copy of the media content item in combination with a first watermark to one or more display devices.

Example Embodiments

As explained above, piracy of media content often attacks watermarks. One technique involves collusion attack, in which a few copies of the same media content item, each embedded with a different unique watermark, collude. In case of video content, a colluder often uses devices to synchronize video inputs. As one or more collusion attack devices compare the videos and align them, the difference is assumed to be the watermark. The colluder then generates a new video by modifying or manipulating the parts that are different between the video inputs and applying an alteration. Once the watermark is removed, piracy activities are undetected. Piracy of media content often applies various alteration techniques, e.g., at the pixel level, over parts of a frame, or over a sequence of frames, in order to corrupt the watermarks.

For example, at the pixel level, a colluder may, for a respective pixel, produce the average value of the respective pixel over the different copies, e.g., having 3 copies each with respective pixel values of 1, 2, and 6, and producing a pixel value of 3. In another example, a colluder may, for a respective pixel, produce the minority or majority value of the respective pixel over the different copies, e.g., having 3 copies each with respective pixel values of 1, 3, and 3, and producing a pixel value of 1 in case of a minority strategy or 3 in case of a majority strategy. Some piracy techniques alter parts of a frame. For example, using a tiling alteration technique, a colluder may split the screen to Y parts, where every part is taken from a different copy. Tiling results in having parts of different watermarks in the video but no complete watermark. Some other piracy techniques alter a sequence of frames. For example, by alternating frames, a colluder may create a new stream using X frames from a first copy and then Y frames from a second copy. For watermark techniques that spread the watermark over a sequence of frames, alternating frames results in either no watermark identifier or a false positive. Other possible collusion techniques, such as machine learning based collusions and/or a combination of collusion techniques implemented at a point in time and/or over time, can be used by a colluder to attack watermarks.

FIG. 1 illustrates an exemplary collusion resistant system 100 in accordance with some embodiments. In some embodiments, the collusion resistant system 100 obtains a base copy 105 of a media content item from a storage 101 storing media content. In some embodiments, a media content item stored in the storage 101 includes any suitable media data, for example, visual data, audio data, and/or text, etc. In some embodiments, the media content item, which can be live or from a pre-recorded source is stored in clear in the storage 101, thus allowing the base copy 105 of the media content item to be reused in different formats (e.g., different encoding formats for OTT content) and to be packaged dynamically by the packager/encoder. In some embodiments, the media content item can be encoded as MPEG-2, MPEG-4, MP3, AC-3, and/or any other suitable format.

In some embodiments, the collusion resistant system 100 includes a receiver 102 for receiving requests for the media content item, an embedder 110 for embedding watermarks and a transformer 120 for transforming the media content item 105. In some embodiments, the collusion resistant system 100 further includes a transmitter 130 to send copies of the transformed watermark embedded media content item, e.g., copy 1 of transformed watermark embedded media content item 140-1, copy 2 of transformed watermark embedded media content item 140-2, . . . , copy x of transformed watermark embedded media content item 140-x, and copy y of transformed watermark embedded media content item 140-y (collectively referred to as copies of the transformed watermark embedded media content item 140 or copies 140). Among the copies 140, some copies, e.g., copy x 140-x and copy y 140-y, are sent in response to requests from one or more legitimate users 190, e.g., one or more paid subscribers. In case a colluder 180 attempts collusion attacks by requesting multiple copies from the collusion resistant system 100, the collusion resistant system 100 sends at least two copies, e.g., copy 1 140-1 and copy 2 140-2, to the colluder 180.

In some embodiments, the embedder 110 embeds watermark(s) in the media content item 105. As explained above, the watermarking process typically involves modifying the media content item 105 to encode a watermark identifier in an imperceptible manner while still allowing recovery of the watermark identifier even if the media content item is modified. The watermark identifier can be used to identify operators, redistribution networks, and/or user devices. There are two major approaches to watermark integrations. One operates in a single step (also referred to as single-step watermarking) and the other has a preprocessing step (also referred to as two-step watermarking or A/B watermarking). Further, there are two major approaches for watermark deployments, i.e., a client-based approach and a server-based approach.

In single-step watermarking, each of the copies 140 has a uniquely embedded watermark. Single-step watermarking is typically used in client-based deployments. However, it can also be integrated within a video encoder, e.g., for postproduction or screeners, to embed a small number of unique watermark variants. In two-step watermarking, a bitstream is used to facilitate the watermarking. In other words, each element of the original media content item (e.g., each segment in a video stream) is a bit in the bitstream. The bitstream is encoded by using a small number, typically two, variants of the original media content item. In some embodiments, the variants are generated in a preprocessing step. The variants can be seen as pre-watermarked variations of the original media content item. In the second step of such embodiments, the bitstream is created by interchangeably use portions, e.g., segments, chunks, fragments, or packets, of each media content item variation. As used herein, the terms "segment", "fragment", and "chunk" are used interchangeably, unless otherwise explicitly noted. Alternatively, in some other embodiments, the two variants are not generated during the preprocessing step. Instead, the original media content item is preprocessed to identify and instructions for variant generation are generated. In such alternative embodiments, both variant generation and the sequencing are performed in the second step. The preprocessing step is typically implemented in the video encoding headend. The second step may be implemented in other components of the media chain, e.g., at an encoder, a packager, a multiplexer, an over-the-top (OTT) origin server, an OTT playlist server, a content distribution network (CDN) server (central or edge), or a client device.

In some embodiments, the transformer 120 applies different transformations to the base copy 105 in response to different requests, i.e., copy 1 140-1 is different from copy 2 140-2. When the colluder 180 attempts to generate an output video by combining multiple copies, e.g., copy 1 140-1 and copy 2 140-2, the output is a media content item with downgraded quality 150, e.g., to the level that makes the pirated copy undesirable. On the other hand, for legitimate user(s) 190, the transformations by the transformer 120 do not downgrade the quality. In the exemplary collusion resistant system 100, copy x of transformed watermark embedded media content item 140-$x$ and copy y of transformed watermark embedded media content item 140-$y$ satisfy a viewing performance criterion that is set relative to a viewing performance characterization of the base copy of the media content item 105. As such, the transformations by the transformer 120 have a minor effect on the final media content item video for display to the legitimate user(s) 190.

As will be shown below with reference to FIGS. 2A-2C, the transformation of the base copy 105 by the transformer 120 is independent of the watermarking techniques utilized by the embedder 110, e.g., whether the watermarking is deployed at a headend or a client device and/or according to single-step watermarking or two-step watermarking. Further, the transformation of the base copy 105 by the transformer 120 can be applied before or after the watermark embedding. When the transformations are applied after embedding the watermarks, since the transformations have a minor effect on the final video, any watermark that meets the minimal requirements for watermark robustness is not expected to be harmed as a result of the transformations. As such, the solution described herein in accordance with various embodiments does not degrade the original watermark detectability.

As explained above, the assumption of any collusion attack is that multiple copies of the media content are aligned and the only difference is the watermark. The collusion resistant methods and systems disclosed herein cause misalignment among the multiple copies. As a result, any collusion techniques on the transformed media content would produce a poor viewing experience and hence preventing the pirates from generating income on a paid subscriber basis and avoiding being detected. For example, using a tiling alteration technique, the colluder 180 may split the screen to Y parts (e.g., 2 parts as shown in FIG. 1), where every part is taken from a different copy (e.g., the top part from copy 1 140-1 and the bottom part from copy 2 140-2). The combined copy 150 from the two parts produces a distorted basketball image. A colluder might manually recover from some of the transformations and provide a decent viewing experience to the viewers. However, the manual approach would add significant cost and effort to the piracy operation. Furthermore, as will be described in detail below, in some embodiments, varying transformations over time would make such manual recovery nearly impossible and not worthwhile.

It should be noted that components are represented in the exemplary collusion resistant system 100 for illustrative purposes. The system 100 can include more, less, and/or different elements than shown in FIG. 1 in various embodiments. For example, the system 100 may also include one or more encoders, packagers, and/or multiplexers, an OTT server, an OTT playlist server, and/or one or more CDNs, etc. Further, elements can be divided, combined, and/or re-configured to perform the collusion resistant functions described herein. Additionally, each of the elements of system 100 includes appropriate hardware, software, and/or firmware to perform the operations attributed to the elements herein. Some examples of appropriate hardware, software, and/or firmware for certain elements will be provided further below. Operation(s) attributed to an element of system 100 herein should not be considered binding and in some embodiments, other element(s) in the system 100 may additionally or alternatively perform such operation(s).

Further, although a single media content storage 101, a single receiver 102, a single embedder 110, a single transformer 120, and a single transmitter 130 are illustrated in FIG. 1, the system 100 may include one or more media content storages 101, one or more receivers 102, one or more embedders 110, one or more transformers 120, and one or more transmitters 130. For the sake of simplicity, the subject matter will be described hereinafter for the most part with reference to a single media content storage 101, a single receiver 102, a single embedder 110, a single transformer 120, and a single transmitter 130. In some embodiments, one or more receivers 102, one or more embedders 110, one or more transformers 120, and one or more transmitters 130 are distributed on multiple devices. For example, a headend may have one or more receivers 102, one or more embedders 110, one or more transformers 120, and one or more transmitters 130 distributed across one or more servers. In another example, one or more client devices may have one or more receivers 102, one or more embedders 110, one or more transformers 120, and one or more transmitters 130 on one or more client devices.

FIGS. 2A-2C are block diagrams illustrating various configurations of collusion resistant systems 200A-200C in accordance with some embodiments. In FIG. 2A, a headend 210A includes a receiver 102A (e.g., the receiver 102, FIG. 1) for receiving one or more requests for one or more media content items from one or more client devices, an embedder 110A (e.g., the embedder 110, FIG. 1), a transformer 120A (e.g., the transformer 120, FIG. 1) for transforming media content items, and a transmitter 130A (e.g., the transmitter 130, FIG. 1) for sending copies of transformed watermark embedded media content items to client devices in accordance with some embodiments. In some embodiments, the embedder 110A applies single-step, two-step, or other watermarking techniques to embed watermarks in media content items from the headend 210A. In some embodiments, in headend based watermarking, e.g., the two-step watermarking, the headend 210A generates multiple copies of each segment, e.g., two copies of each segment. The embedder 110A then embeds a different watermark in each copy, e.g., 0 is embedded in segment i in the first copy, and 1 is embedded in segment i in the second copy. When the client device receives a sequence of segments, for each segment, the client device choses a particular copy (with the corresponding watermark) based on the client device ID. For example, for segment i, if a particular bit of the client device ID is 0, the client device receives the first copy of segment i with 0 embedded. On the other hand, if the particular bit is 1, the client device receives the second copy with 1 embedded.

In some embodiments, as will be described in further detail below with reference to FIG. 6, in headend based transformation, the transformer 120A determines which transformations to apply and generates multiple copies, e.g., two copies, for each segment and performs a different transformation on each of them. Each client device receives a sequence of transformed segments. For each segment, the client device choses one of the copies, e.g., based on the ID and/or randomly, etc. Further, in some embodiments, the transformer 120A aligns the start and the end of the transformation with the segment boundaries, e.g., by fading in and/or fading out at the beginning and the end of a segment, or by aligning the segments with a scene change. In some embodiments, at least one of the start or the end of the first transformation is within a respective segment boundary of the segment boundaries. For example, the start of the transformation can appear after the segment beginning, and the transformation may end before the segment ends. Moreover, in some embodiments, when the resolution of each copy is different, the media content is divided into other units, e.g minutes, instead of into segments. In such embodiments, aligning the transformations includes aligning the transformations with the start and the end of each minute. As such, every copy includes one or more whole transformations (i.e., no partial transformations).

The transformer 120A transforms each copy of the media content items before or after the embedder 110A embeds the watermarks in accordance with various embodiments. In some embodiments, the transformer 120A is integrated with an encoder so that the transformations are carried out in the headend 210A before, after, or during the encoding process. As such, when the transmitter 130A transmits multiple copies of the transformed watermark embedded media content items, these copies are misaligned and/or uncorrelated to resist collusion attacks.

In FIG. 2B, a client device 220B includes a receiver 102B for receiving one or more requests for one or more media content items and/or for receiving one or more media content items, an embedder 110B (e.g., the embedder 110, FIG. 1) for applying single-step or other watermarking techniques to embed watermarks in media content items on the client device 220B, a transformer 120B (e.g., the transformer 120, FIG. 1) to transform the media content items, and one or more transmitters 130B (e.g., the transmitter 130, FIG. 1) in accordance with some embodiments. In some embodiments, the one or more transmitters 130B sends one or more requests to a server (e.g., a headend) for a base copy of a media content item. In some embodiments, for client based watermarking, e.g., the single-step watermarking, multiple client devices receive the same media content, e.g., the same video, from the server. The embedder 110B on each of the client devices embeds a watermark, which represents its ID. In some embodiments, the embedder 110B embeds the watermark in full in the payload in each frame. In some other embodiments, the client device embeds the watermark bit-by-bit.

In case the media content item is a video stream, in some embodiments, as will be described below with reference to FIG. 3, the transformer 120B applies watermark like transformations, such as applying the single-step watermarking techniques in full on a single frame as a transformation of the frame. As such, in client based transformation, the client device 220B receives the media content, e.g., a video, and the transformer 120B performs a transformation or a set of transformations on the video. When the transformer 120B applies a set of transformations, the transformations fade in and/or fade out or aligned with scene change for a smooth transition between the transformations. When the transmitter 130B sends the frames to, for example, a rendering unit or module, each frame is transformed with an embedded watermark. As such, every client device 220B has its own variants, and copies from different client devices are mis-aligned and/or uncorrelated to resist collusion attacks. In order to have a variety of transformations over time, in some embodiments, the transformer 120 on the client device 220B also changes a transformation method occasionally, sometimes, and/or periodically. In the exemplary configuration shown in FIG. 2B, because the transformations are applied by the client device 220, there is no server cost, scalability, or bandwidth constraint that limits the number of transformations for the media content item.

In some embodiments, in case there are multiple client devices, the transformer 120B on each client device 220B determines and chooses (e.g., randomly or pseudo-randomly) the transformations to be performed (or the parameters for the transformations to be used). Because the transformations are applied randomly, statistically one can assume not all client devices connected to the colluder would have the same transformation at least most of the time. In other words, the transformations applied to the multiple copies are statistically different or satisfy a statistical performance criterion. For example, the statistical performance criterion may specify that the probability of the client devices have the same transformation during a threshold amount of time is less than a threshold probability, e.g., $p<0.01$, etc. As such, the normative case is that the multiple copies used in a collusion attack would be misaligned.

In FIG. 2C, a server 230C includes a receiver 102C (e.g., the receiver 102, FIG. 1) for receiving multiple requests for a base copy of a media content item, an embedder 110C (e.g., the embedder 110, FIG. 1) for applying two-step or other watermarking techniques to embed watermarks in media content items from the server 230C (e.g., a headend), a transformer 120C (e.g., the transformer 120, FIG. 1) to transform the media content items, and a transmitter 130C (e.g., the transmitter 130, FIG. 1) for sending copies of transformed watermark embedded media content items to client devices in accordance with some embodiments. In some embodiments, in order to perform the two-step watermarking techniques, the embedder 110C includes a variants generator 232C to perform the preprocessing step and a sequence generator 234C to create the bitstream using variants from the variants generator 232C. As such, when the transmitter 130C transmits multiple copies of the transformed watermark embedded media content items, these copies are misaligned and/or uncorrelated to resist collusion attacks.

It should be noted that though FIG. 2C illustrates a single server 230C, components and/or functions of the server 230C can be distributed to multiple devices. For example, while the variants generator 232C is typically implemented in the video encoding headend, the sequence generator 234 may be implemented in other components of the media chain, e.g., at an encoder, a packager, a multiplexer, an over-the-top (OTT) origin server, an OTT playlist server, a content distribution network (CDN) server (central or edge), or a client device.

As explained above, in order to perform a collusion attack, a colluder uses multiple copies (e.g., at least two) of aligned media content items. The collusion resistant techniques described herein modify the multiple copies of the media content items, such that the alignment becomes very difficult or impossible. This would either disable the collusion action or result in a corrupted output after the collusion. The collusion resistant techniques described herein include applying a variety of transformations in each copy of the media content item in accordance with some embodiments. Moreover, in some embodiments, the transformer applies different transformations over time in order to make it harder for the colluder to automatically identify the transformations. As will be described below with reference to FIGS. 3-8, the transformations are designed to have a minor influence on visibility. As such, there is no degradation of the viewing experience for legitimate users. More importantly, the transformations are not expected to affect the watermark quality and detectability regardless of what watermark technique is applied. On the other hand, when combining more than one copy of the media content item, the combination of two (or more) different transformations either fails the collusion attack or yields to a very low-quality and/or corrupted copy of the media content item.

FIG. 3 is a block diagram 300 illustrating one transformation technique in accordance with some embodiments. In some embodiments, one or more watermarking techniques, e.g., single-step or two-step watermarking, can be adopted for the purpose of transformations. In some embodiments, the transformer (e.g., the transformer 120B, FIG. 2B) obtains a base copy 310 of a media content item and chooses one or more watermarking techniques to embed one or more arbitrary identifiers in addition to the watermark identifier. This is useful especially in the single-step watermarking, where watermarks are applied in full within an element, e.g., a picture, a page, or a frame. As a result, multiple variants are embedded in multiple copies for multiple client devices, i.e., every client device has its own variants. In the example shown in FIG. 3, an arbitrary identifier is embedded in each of the transformed watermark embedded copies in addition to the embedded watermark, e.g., embedding $ID_1$ and $WM_1$ in copy 1 320-1, $ID_2$ and $WM_2$ in copy 2 320-2, $ID_x$ and $WM_x$ in copy x 320-x, $ID_y$ and $WM_y$ in copy y 320-y, ..., etc.

In many cases, a watermark is imperceptible, e.g., a base copy and the watermark embedded copy are perceptually indistinguishable. In some cases, a watermark is perceptible if its presence in the watermark embedded copy is noticeable (e.g., digital on-screen graphics like a network logo, content bug, codes, opaque images). Even in such cases, on media content items, such as videos and images, the watermarks are often made transparent and/or translucent for the convenience of consumers, since the watermarks may block a portion of the view. As such, adapting watermarking techniques to embed the arbitrary identifiers, the arbitrary identifiers embedded in the copies 320 would have the same perceptibility as the embedded watermarks. Accordingly, the transformation by embedding an arbitrary identifier in each of the copies 320 would not degrade the viewing. In other words, relative to a viewing performance characterization of the base copy 310, each of the transformed watermark embedded copies 320 satisfies a viewing performance criterion. For example, in case the embedded arbitrary identifier and the embedded watermark in copy x 320-x are imperceptible, the base copy 310 and the transformed watermark embedded copy are perceptually indistinguishable. Accordingly, the viewing performance characterization of copy x 320-x satisfies a viewing performance criterion, which is the same as the viewing performance characterization of the base copy 310.

On the other hand, a colluder may initiate a collusion attack by combining at least two copies of the media content item, e.g., combining copy 1 with embedded $ID_1$ and $WM_1$ 320-1 and copy 2 with embedded $ID_2$ and $WM_2$ using any collusion attack techniques. However, comparing and/or synchronizing copy 1 320-1 and copy 2 320-2 would fail, because in addition to the watermarks, the arbitrary identifiers are also different among different copies. Thus, colluding two different variants that are misaligned and/or uncorrelated would yield to a low-quality media content item 330.

Figure 4:
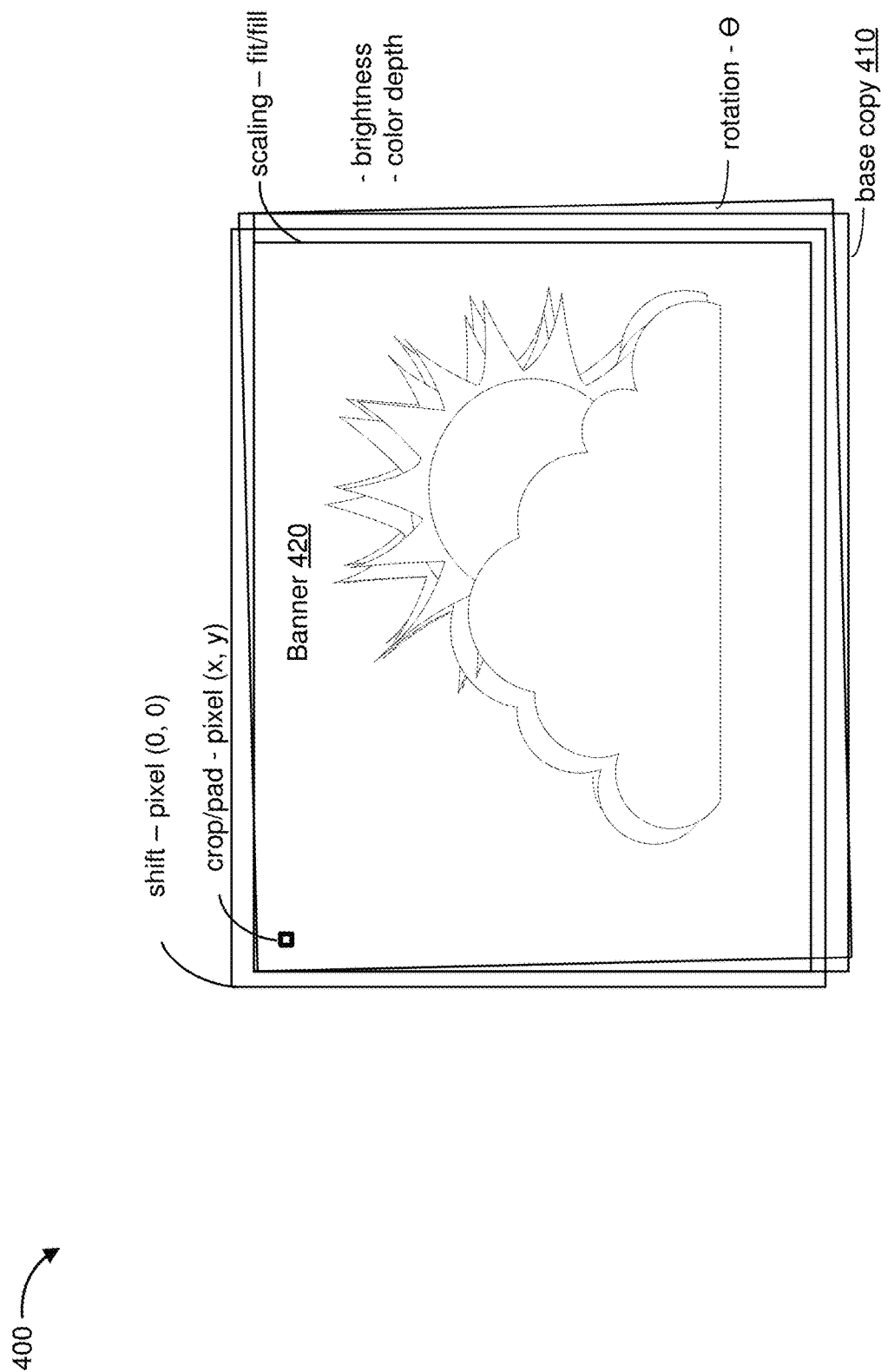
FIG. 4 is a diagram illustrating various transformation techniques in accordance with some embodiments.

FIG. 4 is a diagram 400 illustrating various transformation techniques in accordance with some embodiments. The various transformation techniques can be implemented by a transformer on a server (e.g., the transformer 120A in FIG. 2A or the transformer 120C in FIG. 2C) or a client device. Further, the transformation techniques are independent of watermarking techniques. As such, the collusion resistant techniques can be implemented in conjunction with any watermarking techniques.

In FIG. 4, a base copy 410 of an image is shown. In some embodiments, transformations of the base copy 410 include cropping and/or padding of pixels. For example, removing a threshold number of pixels from two opposite edges (same number of pixels) and padding with black transform the base copy 410 by introducing variants to the image. Because modifying several pixels within a threshold number is hardly noticeable by human vision, there is no degradation of viewing experience and the transformed image satisfies a viewing performance criterion. In some embodiments, the transformations further include randomly selecting one or more edges and/or the number of pixels to crop and/or pad to vary the degree of transformation by cropping and/or padding.

In some embodiments, transformations of the base copy 410 including adding small variations in brightness. In some embodiments, changes to the brightness characteristics are below one or more thresholds so that the perceived brightness changes are subtle. In some embodiments, the brightness transformations are gradual, e.g., fading in and fading out. In some embodiments, the brightness transformation changes over time or according to different random profiles. In some embodiments, transformations of the base copy 410 include randomly picking a different color depth within a threshold range or varying between an 8-bit or 10-bit depths.

In some embodiments, transformations of the base copy 410 include randomizing the location of a banner 420 inserted in the encoder with small variations, e.g., moving the location of the banner 420 within a threshold distance. For example, the transformer may randomly vary the location of a scoring banner in a sports game over time, e.g., occasionally, sometimes, and/or periodically changing the location within a threshold distance from the location of the scoring banner in the base copy 410.

In some embodiments, transformations of the base copy 410 include rotating the display by small (e.g., −1, +1, or within a threshold degree) and/or random degrees ⊖. In some embodiments, transformations of the base copy 410 includes scaling the image. For example, in a fill mode, the transformer stretches the image slightly (e.g., within threshold dimensions) so each copy would have a slightly different image. In another example, in a fit mode, the transformer creates small variations in the pillar width (e.g., within a threshold width deviation), thus slightly stretching the display between the pillars. In some embodiments, the transformations of the base copy 410 include shifting, such as moving the display rectangle so pixel (0, 0) would be in slightly different locations for different variants. In some embodiments, the shifting of pixel (0, 0) is within a threshold distance from the location of pixel (0, 0) of the base copy 410.

Because the transformations in accordance with various embodiments described herein are slight, the changes are generally not perceptible by human eyes. As such, applying any of the transformation techniques or a combination of the various watermarking techniques illustrated in FIG. 4 would not degrade the viewing experience for legitimate users. On the other hand, when a colluder conducts a collusion attack by combining at least two copies of the media content item, because of the transformations, the combined copy would have low quality. As shown in FIG. 4, the image in the combined copy would appear to be blurry. In another example, as shown in FIG. 1, applying the tiling alteration technique, the basket image in the combined copy 150 has distortion and/or is disjointed along the tiling line.

Figure 5:
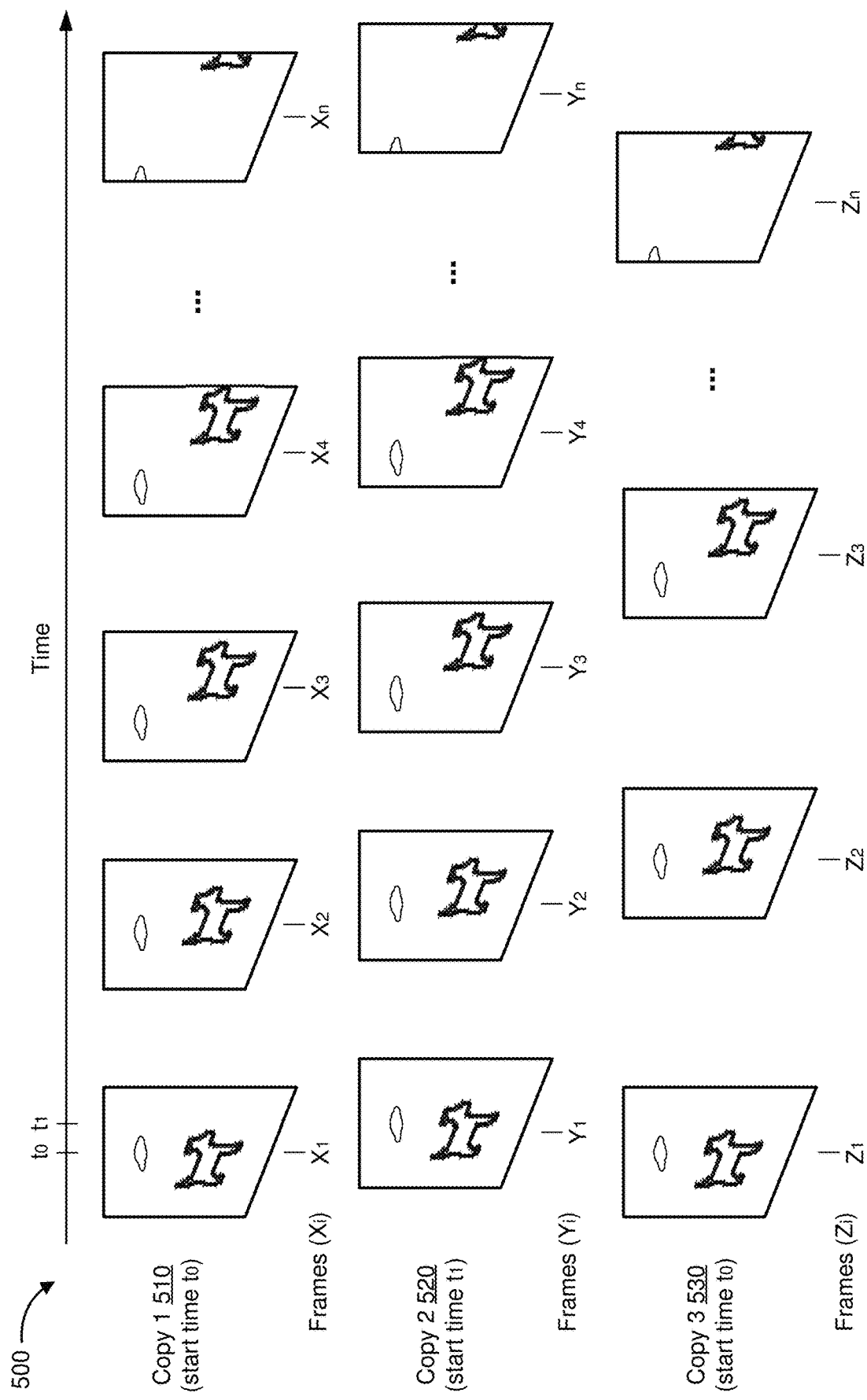
FIG. 5 is a diagram illustrating various other transformation techniques in accordance with some embodiments.

FIG. 5 is a diagram 500 illustrating various video transformation techniques in accordance with some embodiments. In some embodiments, the transformations include introducing time delay to a video stream. For example, assuming a base copy of a video stream starts at time t0 and includes a plurality of frames, e.g., Frames $(X_i)=\{X_1, X_2, X_3, X_4, \ldots, X_n\}$. The transformer generates copy 1 510 by replicating the base copy and optionally applying one or more transformations as described above with reference to FIGS. 3 and 4.

In some embodiments, the transformer generates copy 2 520 by replicating the base copy, e.g., Frames $(Y_i)$=Frames $(X_i)$, and introducing a slight delay in time, e.g., starting at time $t_1$ that is within a threshold amount of time from $t_0$. The slight delay is not perceptible in most cases. However, in case a colluder obtains copy 1 510 and copy 2 520 to attempt collusion attacks, the misalignment between copy 1 510 and copy 2 520 would result in a low-quality or corrupted video.

In some embodiments, the transformations include varying frame rates. For example, the transformer generates copy 3 530 by replicating the base copy, e.g., Frames $(Z_i)$=Frames $(X_i)$, and varying (e.g., lowering or increasing) the frame rate within a threshold amount. The slight modification of the frame rate is not perceptible in most cases, e.g., lower the frame rate when the content has little motion. However, in case a colluder obtains copy 1 510 (and/or copy 2 520) and copy 3 530 to attempt collusion attacks, the misalignment between the copies would result in low quality or corrupted video.

Figure 6:
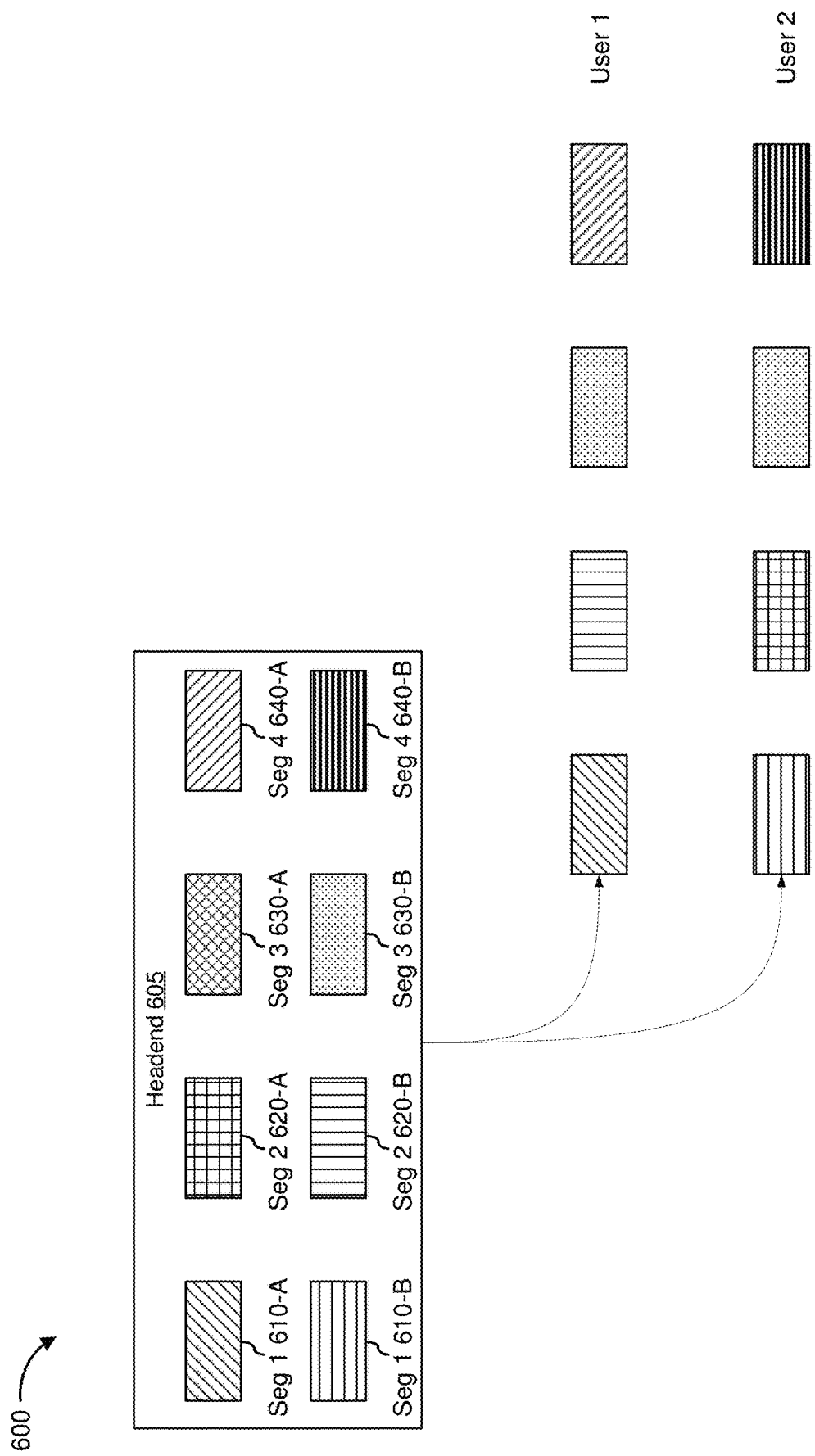
FIG. 6 is a diagram illustrating an exemplary collusion resistant system where transformations are applied in a headend in accordance with some embodiments.

FIG. 6 illustrates an exemplary collusion resistant system 600 where transformations are applied in a headend in accordance with some embodiments. In some embodiments, a headend 605 (e.g., the headend 210A, FIG. 2A, or the server 230C, FIG. 2C) includes a transformer (e.g., the transformer 120A, FIG. 2A, or the transformer 120C) for transforming media content items. In some embodiments, in case the media content item is a stream (e.g., a video stream or an audio stream), the headend 605 generates multiple variants of the stream, where each variant includes a different transformation (or the same transformation but with different parameters) as well as a different watermark (not shown in FIG. 6).

For example, in FIG. 6, segment 1 610-A and segment 1 610-B are two different variants of segment 1 (as indicated by different patterns of shading), e.g., by applying different transformations as described above with reference to FIGS. 4 and 5. Likewise, segment 2 620-A and segment 2 620-B are two different variants of segment 2; segment 3 630-A and segment 3 630-B are two different variants of segment 3, and segment 4 640-A and segment 4 640-B are two different variants of segment 4, etc. When two users, e.g., user 1 and user 2, request the media content item, the headend 605 streams variants of the segments to the users in response to the requests, e.g., streaming segment 1 610-A, segment 2 620-B, segment 3 630-B, and segment 4 640-A to user 1 and streaming segment 1 610-B, segment 2 620-A, segment 3 630-B, and segment 4 640-B to user 2, etc. As such, the streams received by user 1 and user 2 are uncorrelated to resist collusion attacks.

In some embodiments, the headend 605 changes the transformations as time goes in order to have a variety of transformations over time. For example, following a segment-based approach (or a set of segments based approach), where the headend 605 applies a different transformation to each segment (or to each set of the segments). For each segment, the user receives one transformed copy of the segment. The two streams generated in response to two requests may include certain portions that are the same. However, along the timeline, the streams are different. As shown in FIG. 6, both user 1 and user 2 receive the same transformed segment 3. However, the stream received by user 1 is different from the stream received by user 2 over time. In some embodiments, each variant of each segment also includes a different watermark. In such embodiments, each stream to a user includes both a unique watermark sequence and one or more unique transformations.

The transformation techniques shown in FIGS. 4-6 are illustrative and not exhaustive. Other transformation techniques that satisfy the viewing performance criterion may be applied in place of or in combination with the techniques shown in FIGS. 4-6. Further, the collusion resistant systems described herein in accordance with various embodiments can apply one transformation technique or a combination of transformation techniques. Additionally, the transformation techniques and/or the parameters for a respective transformation technique may vary over time to resist collusion attacks without degrading the viewing experience for legitimate users.

In some embodiments, the transformations shown in FIGS. 4-6 are performed in the uncompressed domain. Some transformations do not incur an additional cost from re-encoding, such as the time delay transformation as shown in FIG. 5. In FIG. 5, to generate and transmit copy 2 520 with the start time $t_1$, the transformer replicates the base copy frames, e.g., Frames $(Y_i)$=Frames $(X_i)$, and delays the transmission of copy 2 520 without performing any re-encoding. To perform other transformations, multiple encoders (e.g., one for each copy) may be deployed in the headend and/or the client device. In some embodiments, to avoid duplication of encoders, the transformer enables transformations on compressed media content items or other cost-effective methods for encoders.

For example, the transformations as shown in FIG. 4 can share the pre-analysis part of the media content item and the decoder in case of transcoding to reduce the amount of calculation. In particular, for the cropping and/or padding transformation, the transformer can re-use the motion vectors and the mode decisions of the non-transcoded versions of a media content item. In another example, for the banner location transformation, the transformer can re-use the motion vectors and the mode decision for macroblocks that do not refer to regions associated with the banner. In cases where motion vectors are re-calculated (e.g., the brightness transformation and/or the rotation transformation, etc.), the transformer can re-calculate the initial motion vectors based on the motion vectors of the non-transformed version (e.g., the base copy 410, FIG. 4) and re-use the mode decision of the non-transformed version as the initial mode. The transformer can then use the initial motion vector and mode to find a better motion vector and mode in a reduced search space for the transformed copy. Following this approach, the encoder effort is significantly reduced. In cases where the transformer does have a separate encoder in connection with the transformations (e.g., the frame rate transformation as shown in FIG. 5), the separate encoder can still share the pre-analysis part of the video encoder and decoder in case of transcoding for cost savings.

Figure 7:
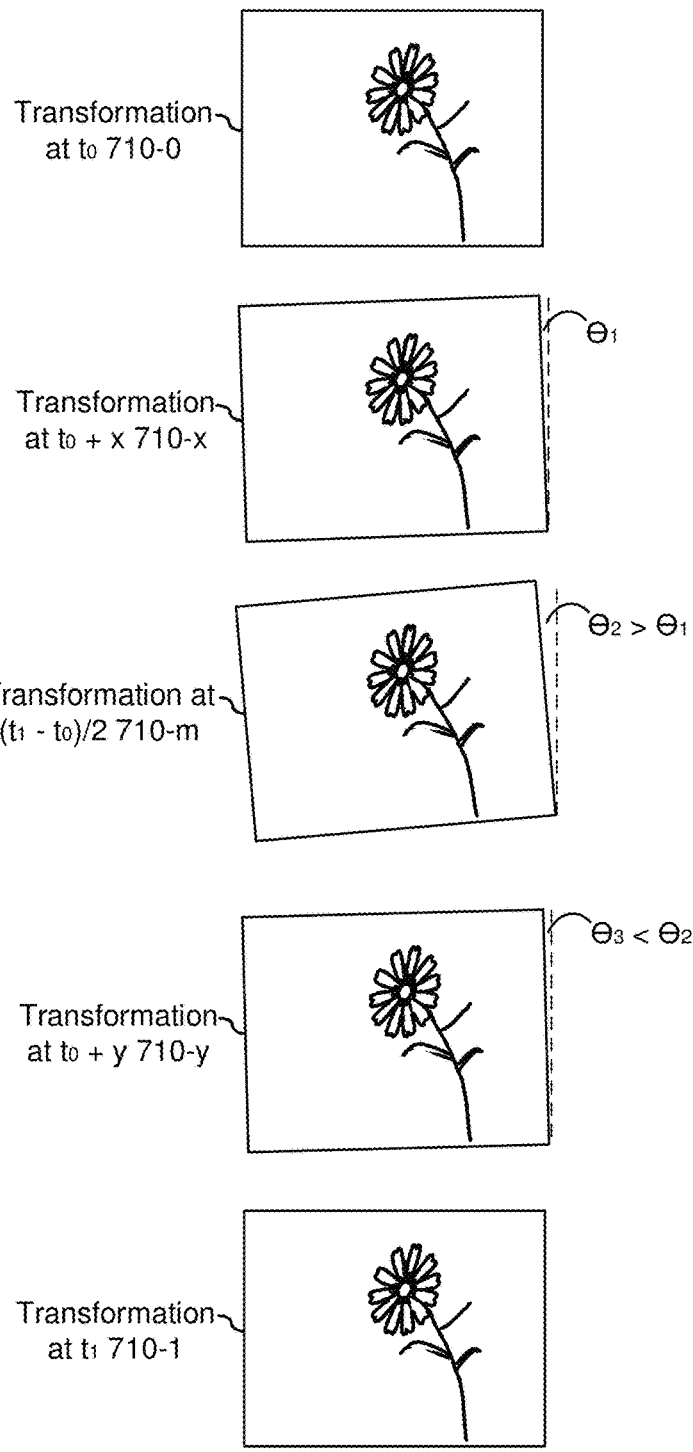
FIG. 7 is a diagram illustrating transitioning between transformations with fading in and fading out in accordance with some embodiments.

FIG. 7 is a diagram 700 illustrating one embodiment of transitioning between transformations with fading in and fading out in accordance with some embodiments. As explained above, in some embodiments, the collusion resistant system described herein can change the chosen transformation and can have multiple transformations. To ensure the viewing experience for legitimate users, in some embodiments, the transformations are applied gradually to avoid low-frequency effects. In some embodiments, for headend-based transformations, the transformer (e.g., the transformer 120A, FIG. 2A, or the transformer 120C, FIG. 2C), applies the transformation on chunk boundaries. In some embodiments, the transformer (e.g., the transformer 220B, FIG. 2B) starts at the chunk boundary with some transformation (or without transformation). The transformer then gradually increases the magnitude of the transformation to the middle point of the segment, and gradually decreases the magnitude before moving to another transformation in a gradual manner.

For example, in FIG. 7, time $t_0$ and time $t_1$ mark the chunk boundaries. At the beginning of the chunk boundary, the segment has no transformation at time $t_0$ 710-0. The transformer gradually increases the magnitude of the transformation. In the case of rotation transformation, as shown in FIG. 7, the rotation degree increases from 0 degree to $\ominus_1$ at time $t_0$+x 710-x. The increase of the rotation degree continues until the middle point of the segment, e.g., the transformation at time $(t_1-t_0)/2$ 710-m peaks with the rotation degree $\ominus_2$ greater than $\ominus_1$ at time $t_0$+x. Once the middle point of the segment has passed, the transformer gradually reduces the magnitude of the transformation, e.g., the rotation degree decreases from $\ominus_2$ at time $(t_1-t_0)/2$ 710-m to $\ominus_3$ at time $t_0$+y 710-y. At the end of the chunk boundary, the segment has no transformation at time $t_1$ 710-1.

Figure 8:
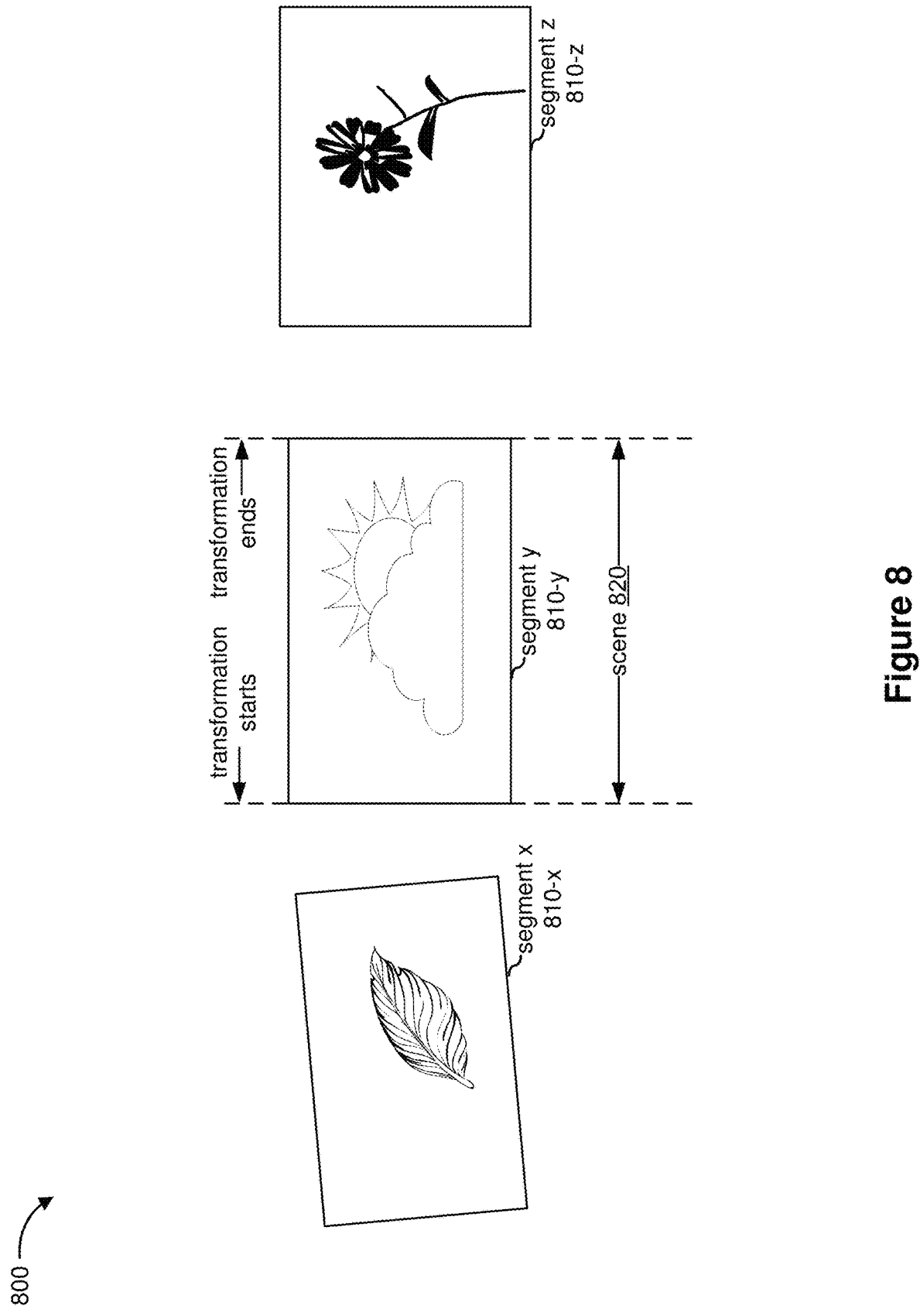
FIG. 8 is a diagram illustrating aligning transitions of transformations with scene change in accordance with some embodiments.

FIG. 8 is a diagram 800 illustrating aligning transitions of transformations with scene changes in accordance with some embodiments. In some embodiments, in order to provide a viewing experience to legitimate users that satisfies a viewing performance criterion, the transformer aligns the start and the end of the transformation with scene changes. The idea is based on the observation that human eyes are not sensitive enough to distinguish between two different transformations if an image is significantly changed.

For headend-based transformations, transformations are often applied on segment-based resolution (or applied on a set of segments). As such, in some embodiments, the segment boundaries are aligned with scene changes to provide a smooth transition. For client-based transformations, in some embodiments, the client device receives a signal when a scene change occurs (possibly an ahead-of-time notification). On the scene change, the transformer (e.g., the transformer 120B, FIG. 2B) chooses a different transformation.

For example, boundaries of segment y 810-y are aligned with the start and the end of a scene 820. Prior to the scene 820, the transformer, for example, applies the rotation transformation to segment x 810-x. At the start of the scene 820, the transformer chooses a different transformation, e.g., not rotating or scaling, and the chosen transformation ends at the end of the scene 820. Because the image in segment y 810-y has significantly changed relative to segment x 810-x, the transformation changes at the beginning of the scene 820 are indistinguishable. Likewise, at the end of the scene 820, when the transformer chooses a different transformation, e.g., scaling of segment z 810-z, the transformation changes are indistinguishable.

Figure 9A:
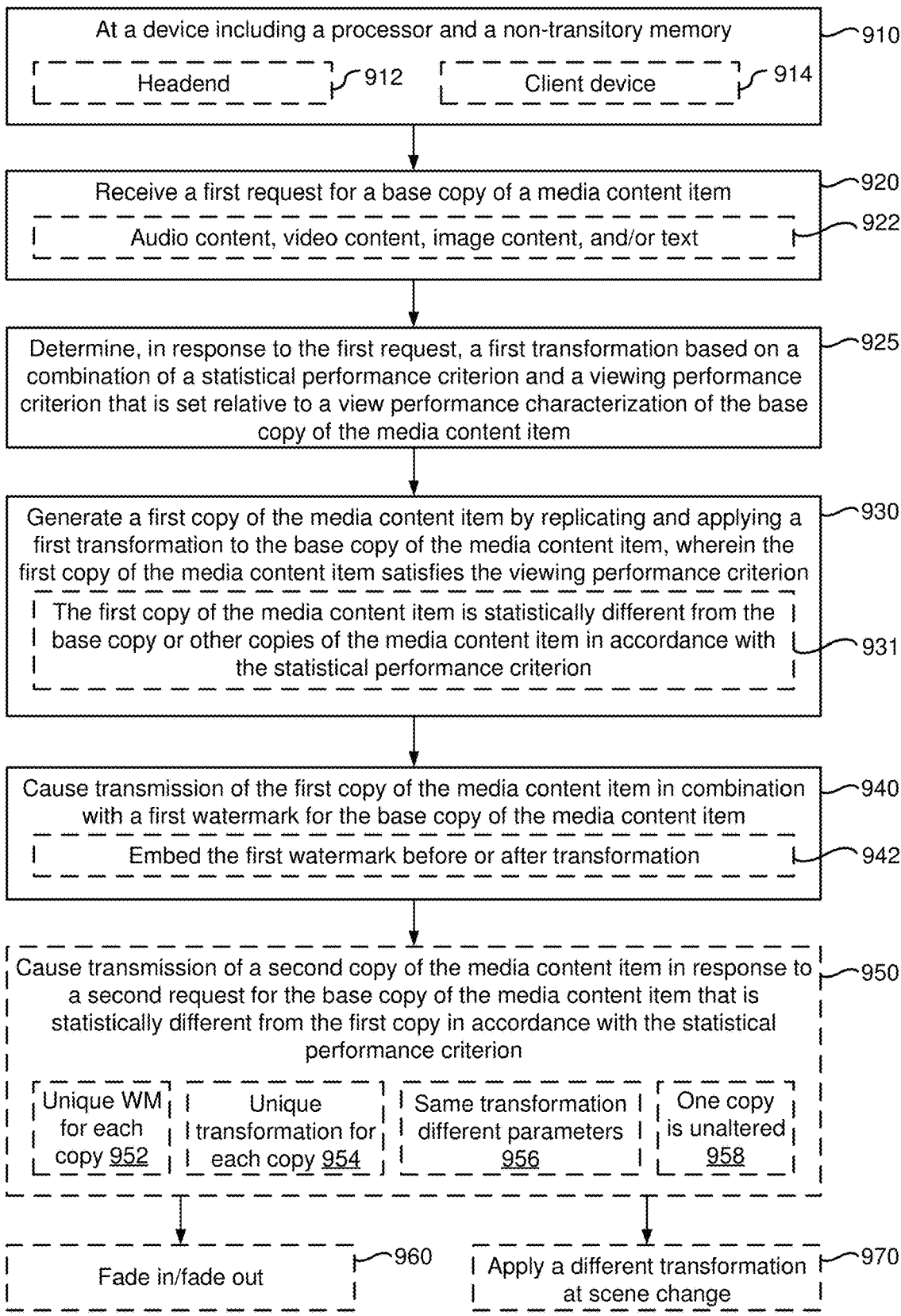
FIGS. 9A and 9B are flowcharts illustrating a collusion resistant method in accordance with some embodiments.
Figure 9B:
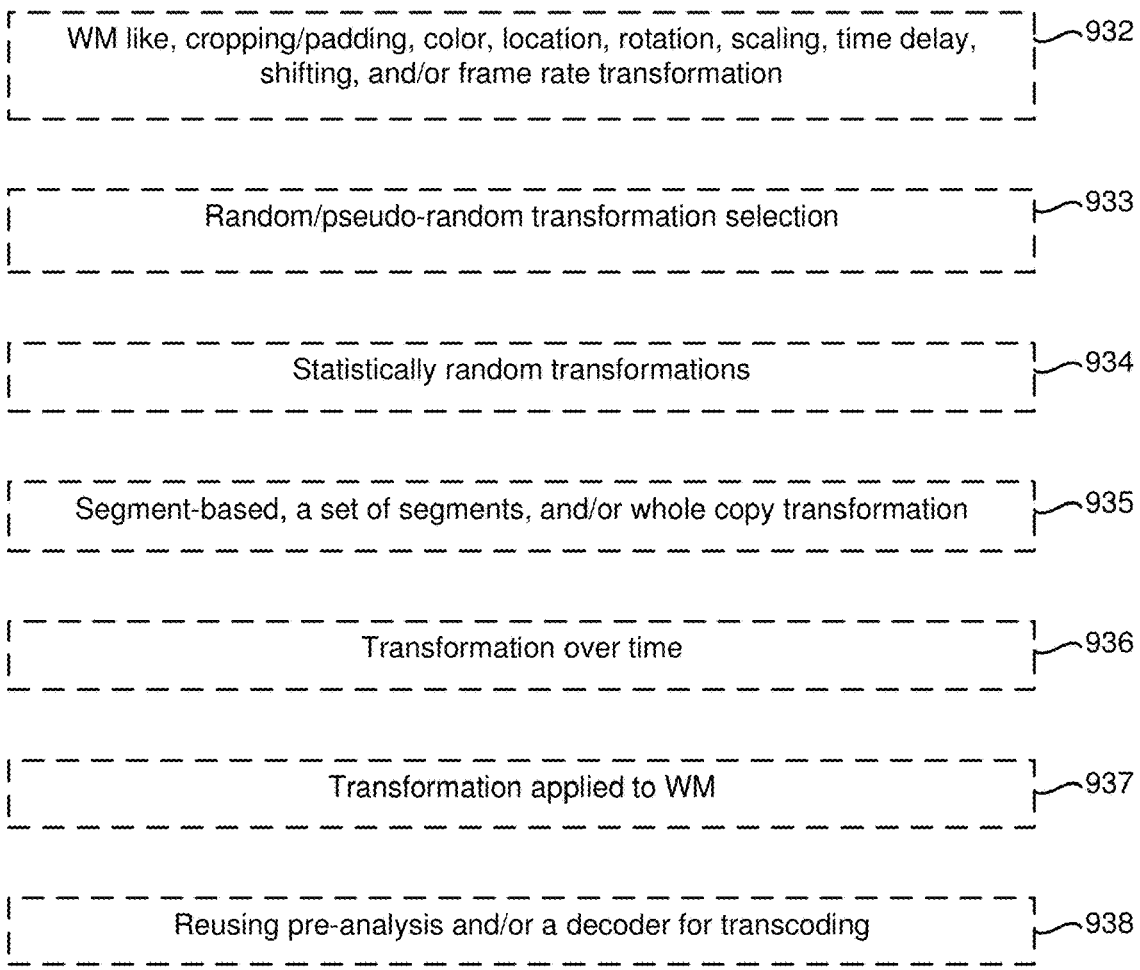

FIGS. 9A and 9B are flowcharts illustrating a collusion resistant method 900 in accordance with some embodiments. As represented by block 910, in some embodiments, the method 900 is performed at a device including a processor, e.g., for executing instructions for the request handling, the watermark embedding, the applications of transformations, and the transmission handling, and a non-transitory memory for storing the instructions and/or storing media content items. In some embodiments, the device includes at least one of a headend or a client device.

In other words, as represented by block 912, in some embodiments, the device is a headend (e.g., the headend 210A, FIG. 2A), which includes one or more receivers (e.g., the receiver 102A, FIG. 2A) for receiving requests, one or more embedders (e.g., the embedder 110A, FIG. 2A) for embedding watermarks, one or more transformers (e.g., the transformer 120A, FIG. 2A) for applying transformations to copies of media content items, and one or more transmitters (e.g., the transmitter 120A, FIG. 2A). In some other embodiments, as represented by block 914, the device is one or more client devices (e.g., the client device 220B, FIG. 2B), which includes one or more receivers (e.g., the receiver 102B), one or more transmitters (e.g., the transmitter 130B, FIG. 2B) for transmitting requests and sending transformed watermark embedded media content items for display, and one or more transformers (e.g., the transformer 120B, FIG. 2B) for transforming media content items. In some embodiments, the device includes a plurality of devices to perform the method 900. Further, one or more components of the embedder and the transformer can be implemented in other components of the media chain. For example, though FIG. 2C illustrates the sequence generator 234C being located on the server 230C, the sequence generator 234C can be implemented, e.g., at the encoding, packaging, or multiplexing, at an OTT origin server, on an OTT playlist server, on a CDN server (central or edge), or in a client device. As such, the collusion resistant method 900 is flexible in headend-based and/or client-based transformation and independent of the watermark techniques, whether the transformation and/or the watermarking are performed at the headend or the client device.

Briefly, the method 900 includes receiving a first request for a base copy of a media content item; determining, in response to the first request, a first transformation based on a combination of a statistical performance criterion and a viewing performance criterion that is set relative to a view performance characterization of the base copy of the media content item; generating a first copy of the media content item by replicating and applying a first transformation to the base copy of the media content item, wherein the first copy of the media content item satisfies the viewing performance criterion, and the first copy of the media content item is statistically different from the base copy (and/or other copies) of the media content item in accordance with the statistical performance criterion; and causing transmission of the first copy of the media content item in combination with a first watermark for the base copy of the media content item.

To that end, as represented by block 920, the method 900 begins with receiving a first request for a base copy of a media content item. In some embodiments, the method 900 further includes receiving a second request for the base copy of a media content item. For example, in FIG. 1, one or more client devices send multiple requests, e.g., request 1, request 2, . . . , request x, and request y, etc., for a base copy of a media content item. In some embodiments, as represented by block 922, the media content item includes one or more of audio content, video content, image content, and text. As such, the collusion resistant method 900 is flexible and adaptive to tackle collusion attacks on any type of media content.

Regardless of the type of media content item requested, the method 900 continues, as represented by block 925, with the transformer determining, in response to the first request, a first transformation based on a combination of a statistical performance criterion and a viewing performance criterion that is set relative to a view performance characterization of the base copy of the media content item. Various methods of generating transformed copies of the media content item are explained below and shown in FIG. 9B. Using any of the various transformation methods described herein in accordance with embodiments, as shown in FIG. 1, each of the transformed watermark embedded copies 140 satisfy a viewing performance criterion set relative to a viewing performance characterization of the base copy, e.g., the viewer perceived differences between the transformed watermark embedded copies 140 and the non-transformed media content item are negligible. Moreover, by applying the first transformation, the transformations applied by the transformer satisfy a statistical performance criterion, e.g., the probability of the transformations (including the first transformation) are the same during a threshold amount of time is less than a threshold probability.

As represented by block 930, the method 900 continues, with the transformer generating a first copy of the media content item by replicating and applying a first transformation to the base copy of the media content item, wherein the first copy of the media content item satisfies the viewing performance criterion. For example, in FIG. 1, the transformer 120 generates multiple copies 140 of the base copy 105 in response to the requests by replicating the base copy (e.g., a non-transformed copy of the media content item) and applying transformations. Various methods of generating transformed copies of the media content item are explained below and shown in FIG. 9B. Using any of the various transformation methods described herein in accordance with embodiments, in FIG. 1, each of the transformed watermark embedded copies 140 satisfy a viewing performance criterion set relative to a viewing performance characterization of the base copy, e.g., the viewer perceived differences between the transformed watermark embedded copies 140 and the non-transformed media content item are negligible. For instance, in FIG. 4, when shifting pixel (0, 0) within a threshold distance, modifying a small number of pixels during cropping and/or padding, slightly brightening or dimming, varying the color depth for a small amount, rotating within a threshold angle range, and/or moving the location of the banner 420 within a threshold distance, etc., the slight transformation is hardly noticeable. Thus, the transformed copy satisfies the viewing performance criterion set relative to the viewing performance characterization of the base copy. As such, the collusion resistant method 900 preserves the quality of the media content item for legitimate users.

Further, as represented by block 931, in some embodiments, the first copy of the media content item is statistically different from the base copy and other copies of the media content item in accordance with the statistical performance criterion. For example, although one copy may have no transformation at one time, the copy is statistically different from the base copy of the media content item in accordance with the statistical performance criterion, because other copies may include transformations. In some embodiments, in accordance with the statistical performance criterion, each of the transformed watermark embedded copies 140 is not only statistically different from the base copy of the media content item, but also statistically different from previously generated copies of the media content item generated by the device. For example, a headend may generate multiple copies of the media content item and determine different transformations to apply (including applying no transformations to one or more copies), so that the probability of these multiple copies have the same transformation within a threshold time window is less than a threshold probability. In another example, multiple client devices may each determine and apply transformation(s) to the copy it receives. Statistically, the copies among these multiple client devices have different transformations at most of the time.

Still referred to FIG. 9A, the method 900 continues, as represented by block 940, with the device causing transmission (e.g., by the transmitter) of the first copy of the media content item in combination with a watermark in response to the first request for the base copy of the media content item. For example, in FIG. 1, copy 1 of transformed watermark embedded media content item 140-1 is transmitted in response to request 1. In some embodiments, as represented by block 942, the first watermark is combined with the first copy of the media content item before or after applying the first transformation to the base copy of the media content item. Because the transformations can be applied before or after watermark embedding, the collusion resistant method 900 is independent of the watermarking technique, e.g., whether embedding the watermark at the headend as shown in FIG. 2A or the client device as shown in FIG. 2B. Further, since the transformations have a minor effect on the media content item, applying transformation after embedding watermarks would not harm any watermark that meets the minimal requirements for watermark robustness. As such, the collusion resistant method 900 does not degrade the detectability of the original watermark.

In some embodiments, the method 900 includes receiving a second request for the base copy of the media content item, and causing transmission of a second copy of the media content item in response to the second request for the base copy of the media content item, wherein the second copy of the media content item is statistically different from the first copy in accordance with the statistical performance criterion. For example, in FIG. 1, copy 2 of transformed watermark embedded media content item 140-2 is transmitted in response to request 2. In another example, in FIG. 3, multiple client devices may each determine and apply transformation(s) to the copy it receives, e.g., one client device determines ID 1 to be embedded in copy 1 320-1 and another client device determines ID 2 to be embedded in copy 2 320-2, etc. Statistically, the copies 320 among the multiple client devices have different transformations at most of the time and the probability that the copies 320 have the same transformation at least most of the time is less than a threshold probability.

In some embodiments, as represented by block 952, the second copy of the media content item includes a second watermark that is different from the watermark, so that each copy includes a unique watermark to facilitate piracy detection. For example, in FIG. 3, copy 1 320-1 can include watermark 1 that is different from watermark 2 embedded in copy 2 320-2. In such embodiments, as represented by block 954, the second copy of media content item is generated by replicating and applying a second transformation that is different from the first transformation to the base copy of the media content item, where the second copy of the media content item satisfies the viewing performance criterion in accordance with some embodiments. For example, in FIG. 4, in addition to having different watermarks, the transformation to the copy sent to user 1 is different from the transformation to the copy sent to user 2. As such, with each copy having both a unique watermark sequence and unique transformation, the multiple copies are misaligned to be robust against collusion attacks.

To ensure the uniqueness of each copy, the transformation is not limited to different types of transformations. As represented by block 956, in some embodiments, the first transformation and the second transformation are of the same type with different transformation parameters. For example, when applying the time delay transformation as shown in FIG. 5, the time delay may vary for different copies. The varying time delay for different copies makes each copy unique and causes misalignment among multiple copies to resist against collusion attacks. In some embodiments, the different transformation parameters include, but are not limited to, different number of pixels cropped and/or padded, different brightness, different color depth, different banner locations, different rotation angles, different scaling aspect in fit or fill mode, different time delay, different coordinates, and/or different frame rate, etc.

In some embodiments, as represented by block 958, the second copy is generated by replicating the base copy and embedding a second watermark. In such embodiments, when one copy is transformed and the other is non-transformed or unaltered, the two copies are misaligned to be collusion resistant. In particular, for client-based transformations, the client device may start with no transformation. When starting with no transformation, the viewing performance characterization of the copy is the same as the base copy.

In some embodiments, as represented by block 960, to not downgrade the viewing experience for legitimate users, the method 900 provides smooth transition between transformations by applying fading in and fading out techniques. In some embodiments, generating the first copy of the media content item by replicating and applying the first transformation to the base copy of the media content item includes identifying a middle point of a portion in the first copy of the media content item, increasing a magnitude of the first transformation until the middle point of the portion, and decreasing the magnitude of the first transformation past the middle point.

For example, as explained above in connection with FIG. 7, upon identifying a middle point of a segment duration at time $(t_1-t_0)/2$. The transformer first gradually increases a magnitude of the rotation transformation (e.g., increasing $\ominus$) until the middle point of the segment duration. The transformer then gradually decreases the magnitude of the rotation transformation (e.g., decreasing $\ominus$) past the middle point. Because of the gradual transformation, the transformed video satisfies the viewing performance criterion set relative to the viewing performance characterization of the base copy.

In some embodiments, as represented by block 970, to not downgrade the viewing experience for legitimate users, the method 900 provides smooth transition between transformations by aligning transitions with a scene change. In some embodiments, the method 900 further includes identifying a scene change in the first copy of the media content item, and selecting a different transformation to apply to the first copy of the media content item in accordance with the scene change. For example, as shown in FIG. 8, because the images in different scenes are significantly different, the human eye is not sensitive enough to distinguish the switching from the rotation transformation and then to the scaling transformation along the segment boundaries. As such, the transformed video satisfies the viewing performance criterion set relative to the viewing performance characterization of the base copy.

Turning to FIG. 9B, FIG. 9 illustrates various transformation methods for generating a transformed watermark embedded copy represented by block 930 (FIG. 9A). In some embodiments, as represented by block 932, the transformations can include, but are not limited to, a watermark like transformation (FIG. 3), cropping and/or padding (FIG. 4), brightness, color, banner location (FIG. 4), rotation (FIG. 4), scaling (FIG. 4), time delay (FIG. 5), shifting (FIG. 4), and/or frame rate (FIG. 5) transformation.

For the watermark-like transformation, in some embodiments, applying a first transformation includes embedding an arbitrary identifier in the base copy to generate the first copy of the media content item. For example, as shown in FIG. 3, each of the copies 320 has an embedded arbitrary identifier in addition to a unique watermark. Such watermark-like transformation is useful especially in single-step watermarking but is independent of the watermark technique, e.g., the transformation can be applying in conjunction with the single-step watermark or two-step watermarking.

For other types of transformations, in some embodiments, the first transformation includes modifying one or more of elements, brightness, color, element location, display angle, scaling aspect, time delay, coordinates, and frame rate associated with transformations of the first copy of the media content item. For example, as shown in FIG. 4, the transformer can apply one transformation selected from cropping and/or padding, brightness, color, banner location, rotation, scaling, time delay, shifting, and/or frame rate transformation. In some embodiments, the transformer can apply more than one type of transformation or apply varying parameters of one type of transformation. Some transformation methods may be more effective against certain types of collusion attacks. Multiple transformations can be applied so that the collusion resistant method 900 is robust, flexible, and adaptive to tackle any collusion attacks.

In some embodiments, as represented by block 933, the first transformation is selected randomly or pseudo-randomly. For example, when applying transformation in the client device as shown in FIG. 2B, each client chooses, e.g., randomly or pseudo-randomly, the transformation to be performed (or the parameters for the transformations to be used). As such, the collusion resistant system has the ability to dynamically and un-predictably change the transformation strategy against various collusion attacks.

In some embodiments, as represented by block 934, the method 900 further includes receiving multiple requests for the base copy of the media content item, and generating multiple copies of the media content item by replicating and applying multiple transformations, wherein the multiple transformations applied to the multiple copies of the media content item are statistically different. Because the transformations are applied randomly, statistically, the client devices connected to the colluder would not have the same transformation at least most of the time. As such, the normative case is that the multiple copies used in a collusion attack will be misaligned, and the collusion resistant method 900 is robust against any collusion techniques.

In some embodiments, as represented by block 935, generating the first copy of the media content item by replicating and applying the first transformation to the base copy of the media content item includes replicating a subportion of the media content item to generate the first copy and applying the first transformation to the subportion of the media content item. For example, in case the media content item is a video, the subportion can be a segment, a set of segment, or the video stream. Further in such embodiments, as represented by block 936, in some embodiments, applying the first transformation to the base copy includes for each subportion of the media content item (e.g., a segment of a video), applying a different transformation. In other words, the collusion resistant method 900 is flexible to apply transformations to a set of segments that can be one segment, e.g., a segment-based solution, more than one segment, or the video stream.

In one example, the set of segments can include the video stream, such as applying a fill mode transformation to modify stretch slightly so each client would have a slightly different image dimension to resist collusion attacks. In the example shown in FIG. 6, the transformation is applied segment-by-segment, so that each segment has a different transformation, and for each segment, the user receives one copy of this segment. In order to have a variety of transformations over time, the transformer changes transformations as time goes. As a result, the two copies of the video stream as shown in FIG. 6 may not be different in every point of time (e.g., segment 3 variant 630-B is in both copies), but along the timeline and over time, the two copies of the video stream are different to resist collusion attacks.

In some embodiments, as represented by block 937, applying the first transformation to the base copy of the media content item includes applying the first transformation to the watermark, wherein the first transformation of the watermark satisfies a watermark robustness criterion. Since the transformations have a minor effect on the media content item, any watermark that meets the minimal requirements for watermark robustness would not be harmed as a result of the transformations. Thus, the collusion resistant method 900 does not degrade the watermark detectability.

In some embodiments, for cost savings, as represented by block 938, applying the first transformation to the base copy of the media content item includes reusing at least one of pre-analysis (e.g., motion vectors and mode decisions) or a decoder associated with the base copy of the media content item for transcoding the first copy.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a device including a processor and a non-transitory memory:
receiving a first request for a base copy of a media content item;
determining, in response to the first request, a first transformation based on a combination of a statistical performance criterion and a viewing performance criterion that is set relative to a view performance characterization of the base copy of the media content item, wherein the statistical performance criterion specifies a threshold probability of variants of the base copy having the first transformation during a threshold amount of time, and the view performance criterion specifies a threshold transformation amount relative to the view performance characterization within which viewer perceived differences between the first copy and the base copy of the media content item being negligible;
generating a first copy of the media content item by replicating and applying the first transformation to the base copy of the media content item, wherein the first copy of the media content item satisfies the viewing performance criterion, and the first copy of the media content item is statistically different from the base copy of the media content item in accordance with the statistical performance criterion during the threshold amount of time; and
causing transmission of the first copy of the media content item in combination with a first watermark for the base copy of the media content item.

2. The method of claim 1, wherein the device includes at least one of a headend or a client device.

3. The method of claim 1, wherein the media content item includes one or more of audio content, video content, image content, and text.

4. The method of claim 1, wherein the first watermark is combined with the first copy of the media content item before or after applying the first transformation to the base copy of the media content item.

5. The method of claim 1, further comprising:
receiving a second request for the base copy of the media content item; and
causing transmission of a second copy of the media content item in response to the second request for the base copy of the media content item, wherein the second copy of the media content item is statistically different from the first copy in accordance with the statistical performance criterion.

6. The method of claim 5, wherein the second copy of the media content item includes a second watermark different from the first watermark.

7. The method of claim 5, wherein the second copy of media content item is generated by:
replicating and applying a second transformation, different from the first transformation to the base copy of the media content item, wherein the second copy of the media content item satisfies the viewing performance criterion.

8. The method of claim 7, wherein the first transformation and the second transformation are of same type with different transformation parameters.

9. The method of claim 1, further comprising aligning a start and an end of the first transformation with segment boundaries.

10. The method of claim 9, wherein at least one of the start or the end of the first transformation is within a respective segment boundary of the segment boundaries.

11. The method of claim 1, wherein generating the first copy of the media content item by replicating and applying the first transformation to the base copy of the media content item includes:
identifying a middle point of a portion in the first copy of the media content item;
increasing a magnitude of the first transformation until the middle point of the portion; and
decreasing the magnitude of the first transformation past the middle point.

12. The method of claim 1, further comprising:
identifying a scene change in the first copy of the media content item; and
selecting a different transformation to apply to the first copy of the media content item in accordance with the scene change.

13. The method of claim 1, wherein applying the first transformation includes:
embedding an arbitrary identifier in the base copy to generate the first copy of the media content item.

14. The method of claim 1, wherein applying the first transformation includes modifying one or more of elements, brightness, color, element location, display angle, scaling aspect, time delay, coordinates, and frame rate associated with the first copy of the media content item.

15. The method of claim 1, further comprising:
receiving multiple requests for the base copy of the media content item; and
generating multiple copies of the media content item by replicating and applying multiple transformations, wherein the multiple transformations applied to the multiple copies of the media content item are statistically different.

16. The method of claim 1, wherein generating the first copy of the media content item by replicating and applying the first transformation to the base copy of the media content item includes:
replicating a subportion of the media content item to generate the first copy; and
applying the first transformation to the subportion of the media content item.

17. The method of claim 16, wherein applying the first transformation to the base copy includes:
for each of the subportion, applying a different transformation.

18. The method of claim 1, wherein applying the first transformation to the base copy of the media content item includes applying the first transformation to the first watermark, wherein the first transformation of the first watermark satisfies a watermark robustness criterion.

19. The method of claim 1, wherein applying the first transformation to the base copy of the media content item includes:
reusing at least one of pre-analysis or a decoder associated the base copy of the media content item for transcoding of the first copy.

20. A system comprising:
one or more receivers operable to receive a first request from a first client device for a base copy of a media content item;
one or more transformers operable to:
determine, in response to the first request, a first transformation based on a combination of a statistical performance criterion and a viewing performance criterion that is set relative to a view performance characterization of the base copy of the media content item, wherein the statistical performance criterion specifies a threshold probability of multiple variants of the base copy having the first transformation during a threshold amount of time, and the view performance criterion specifies a threshold transformation amount relative to the view performance characterization within which viewer perceived differences between the first copy and the base copy of the media content item being negligible;
generate a first copy of the media content item by replicating and applying the first transformation to the base copy of the media content item, wherein the first copy of the media content item satisfies the viewing performance criterion, and the first copy of the media content item is statistically different from the base copy of the media content item in accordance with the statistical performance criterion during the threshold amount of time; and
one or more transmitters to cause transmission of the first copy of the media content item in combination with a watermark for the base copy of the media content item.

21. A method comprising:
at a device including a processor and a non-transitory memory:
receiving a first request for a base copy of a media content item;
determining a first transformation based on a combination of a statistical performance criterion and a viewing performance criterion that is set relative to a view performance characterization of the base copy of the media content item, wherein the statistical performance criterion specifies a threshold probability of multiple variants of the base copy having the first transformation during a threshold amount of time, and the view performance criterion specifies a threshold transformation amount relative to the view performance characterization within which viewer perceived differences between the first copy and the base copy of the media content item being negligible;

generating a first copy of a media content item by replicating and applying the first transformation to the base copy of the media content item, wherein the first copy of the media content item satisfies the viewing performance criterion, and the first copy of the media content item is statistically different from the base copy of the media content item and previously generated copies of the media content item generated by the device in accordance with the statistical performance criterion during the threshold amount of time; and transmitting the first copy of the media content item in combination with a first watermark to one or more display devices.

22. The method of claim 21, wherein generating the first copy of the media content item by replicating and applying the first transformation to the base copy of the media content item includes:

identifying a middle point of a portion in the first copy of the media content item;

increasing a magnitude of the first transformation until the middle point of the portion; and decreasing the magnitude of the first transformation past the middle point.

23. The method of claim 21, further comprising:

identifying a scene change in the first copy of the media content item; and selecting a different transformation to apply to the first copy of the media content item in accordance with the scene change.

24. The method of claim 21, wherein applying the first transformation includes:

embedding an arbitrary identifier in the base copy to generate the first copy of the media content item.

25. The method of claim 21, wherein applying the first transformation includes modifying one or more of elements, brightness, color, element location, display angle, scaling aspect, time delay, coordinates, and frame rate associated with the first copy of the media content item.

26. The method of claim 21, wherein generating the first copy of the media content item by replicating and applying the first transformation to the base copy of the media content item includes:

replicating a subportion of the media content item to generate the first copy; and applying the first transformation to the subportion of the media content item.

27. The method of claim 26, wherein applying the first transformation to the base copy includes:

for each of the subportion, applying a different transformation.

28. A system comprising:

one or more receivers operable to receive a first request for a base copy of a media content item;

one or more transformers operable to:

determine a first transformation based on a combination of a statistical performance criterion and a viewing performance criterion that is set relative to a view performance characterization of the base copy of the media content item, wherein the statistical performance criterion specifies a threshold probability of multiple variants of the base copy having the first transformation during a threshold amount of time, and the view performance criterion specifies a threshold transformation amount relative to the view performance characterization with which viewer perceived differences between the first copy and the base copy of the media content item being negligible; and generate a first copy of a media content item by replicating and applying the first transformation to the base copy of the media content item, wherein the first copy of the media content item satisfies the viewing performance criterion, and the first copy of the media content item is statistically different from the base copy of the media content item and previously generated copies of the media content item generated by the device in accordance with the statistical performance criterion during the threshold amount of time; and one or more transmitters operable to transmit the first copy of the media content item in combination with a first watermark to one or more display devices.

29. The system of claim 28, wherein:

the one or more receivers are further operable to receive a second request for the base copy of the media content item; and the one or more transmitters are further operable to transmit a second copy of the media content item in response to the second request for the base copy of the media content item to the one or more display devices, wherein the second copy of the media content item is statistically different from the first copy in accordance with the statistical performance criterion.

30. The system of claim 29, wherein the one or more transformers are further operable to generate the second copy of media content item by:

replicating and applying a second transformation, different from the first transformation to the base copy of the media content item, wherein the second copy of the media content item satisfies the viewing performance criterion.

* * * * *